(12) United States Patent
Mercurio

(10) Patent No.: US 10,059,273 B1
(45) Date of Patent: Aug. 28, 2018

(54) VEHICLE ROOF TOP CARGO CARRIER

(71) Applicant: James Ira Mercurio, Indianapolis, IN (US)

(72) Inventor: James Ira Mercurio, Indianapolis, IN (US)

(*) Notice: Subject to any disclaimer, the term of this patent is extended or adjusted under 35 U.S.C. 154(b) by 0 days.

(21) Appl. No.: 15/597,853

(22) Filed: May 17, 2017

(51) Int. Cl.
*B60R 9/042* (2006.01)
*B60R 9/045* (2006.01)

(52) U.S. Cl.
CPC ............ *B60R 9/042* (2013.01); *B60R 9/045* (2013.01)

(58) Field of Classification Search
CPC ................................ B60R 9/042; B60R 9/045
USPC ........................................................ 224/310
See application file for complete search history.

(56) References Cited

U.S. PATENT DOCUMENTS

| 3,048,291 A | * | 8/1962 | Mabry | B60P 3/1025 414/462 |
| 3,128,893 A | * | 4/1964 | Jones | B60P 3/1025 414/462 |
| 3,170,583 A |  | 2/1965 | Meyer | |
| 3,193,124 A |  | 7/1965 | Essling | |
| 3,343,696 A | * | 9/1967 | Morrison | B60P 3/1025 414/462 |
| 3,411,644 A | * | 11/1968 | Cook | B60D 1/07 280/477 |
| 3,460,693 A | * | 8/1969 | Oldham | B60P 3/1025 414/462 |
| 3,550,800 A | * | 12/1970 | Robinson | B60P 3/1058 414/462 |
| 3,648,866 A | * | 3/1972 | Slown | B60P 3/1025 414/462 |
| 3,708,081 A | * | 1/1973 | Schladenhauffen | B60P 3/1025 414/462 |
| 3,732,998 A | * | 5/1973 | Martin | B60P 3/1025 414/462 |
| 3,840,133 A | * | 10/1974 | Berg | B60P 3/1025 414/462 |
| 3,843,002 A | * | 10/1974 | Pihlgren | B60P 3/1025 414/462 |
| 3,871,540 A | * | 3/1975 | Jenkins | B60P 3/1025 414/462 |
| 3,872,989 A | * | 3/1975 | Smithson | B60P 3/1025 254/128 |

(Continued)

FOREIGN PATENT DOCUMENTS

EP          2551151 B1      12/2016

*Primary Examiner* — Peter Helvey
(74) *Attorney, Agent, or Firm* — Bruce J. Bowman

(57) ABSTRACT

A vehicle roof top cargo carrier provides pivoting loading/unloading of all types of cargo to and from the carrier via the rear of the vehicle. The vehicle roof top cargo carrier has a frame attachable to existing rack members on the roof of the vehicle, a carriage movably carried on the frame and able to pivot with respect to the frame once the carriage is fully extended from the rear of the frame via pivot rods at the front of the carriage receivable in pivot brackets at the rear of the frame, and a support retained on the carriage and configured to adjustably telescope from the rear of the carriage for contacting the ground. The carriage has cargo receptacles for holding the cargo that can be changed to accommodate different cargo. For height reduction, the carriage may be removed from the frame while the frame remains connected to the vehicle.

16 Claims, 11 Drawing Sheets

(56) References Cited

U.S. PATENT DOCUMENTS

| | | | | |
|---|---|---|---|---|
| 3,877,594 A | * | 4/1975 | Coakley | B60P 3/1025 414/462 |
| 3,894,643 A | * | 7/1975 | Wilson | B60P 3/1025 414/462 |
| 3,927,779 A | * | 12/1975 | Johnson | B60P 3/1025 414/462 |
| 4,058,243 A | | 11/1977 | Tappan | |
| 4,212,580 A | * | 7/1980 | Fluck | B60P 3/1058 298/1 A |
| 4,234,285 A | | 11/1980 | Martinez | |
| 4,269,561 A | * | 5/1981 | Rutten | B60P 3/1016 414/462 |
| 4,420,165 A | * | 12/1983 | Goodin | B60P 3/1033 280/414.1 |
| 4,531,879 A | | 7/1985 | Horowitz | |
| 5,069,595 A | * | 12/1991 | Smith | B60P 3/1025 414/462 |
| 5,108,248 A | * | 4/1992 | Murrill | B60P 3/1025 414/462 |
| 5,123,799 A | * | 6/1992 | Breazeale | B60P 3/1025 414/462 |
| 5,447,408 A | * | 9/1995 | Smith | B60P 3/1025 414/462 |
| 5,505,579 A | | 4/1996 | Ray et al. | |
| 5,921,741 A | * | 7/1999 | Heimgartner | B60P 3/1025 414/462 |
| 6,739,823 B2 | * | 5/2004 | Shirvell | B60P 3/07 414/462 |
| 8,245,893 B2 | | 8/2012 | Sautter et al. | |
| 8,376,684 B2 | * | 2/2013 | Juarez-Ortega | B60P 3/1025 280/414.1 |
| 8,733,604 B2 | | 5/2014 | Murray et al. | |
| 2013/0248567 A1 | | 9/2013 | Townsend | |

* cited by examiner

VEHICLE ROOF TOP CARGO CARRIER

FIELD OF THE INVENTION

The present invention relates to vehicle roof top carriers and, more particularly, to automobile roof top carriers providing easy loading and unloading of a variety of cargo.

BACKGROUND OF THE INVENTION

The roof of a vehicle is a convenient way to stow, hold and transport cargo that is too large, bulky, or unable to fit inside the vehicle, or is otherwise inconvenient for interior vehicle storage. Accordingly, various holders, racks, carriers and the like (collectively, carriers) have been devised for stowing and transporting cargo on the roof of a vehicle. Some carriers are for general purpose while other carriers are for particular purposes such as boats, recreational equipment, camping equipment, bicycles, kayaks, SUPS, and the like.

These prior art vehicle roof top carriers suffer generally from various issues that make them impractical, unwieldy, difficult, and/or clumsy to use. Static vehicle roof top carriers make the user hoist the cargo to the roof for loading it onto the roof top carrier. Heavy cargo thus makes loading and unloading difficult if not dangerous. Because of these issues, various vehicle roof top cargo carriers have been devised having one or more components that can extend from the roof to allow loading and unloading onto the extended component(s). However, even these are disadvantageous. For instance, some vehicle roof top carriers permit loading and unloading only from the side of the vehicle. Depending on where or how the vehicle is parked, one may not be able to load or unload cargo from the side of the vehicle. Moreover, it may be difficult to put the extended portion back onto the roof once cargo has been loaded. Rear load versions use cables, springs or other generally cumbersome manners of receiving then stowing cargo. In still other instances, the vehicle roof top carriers are generally difficult or clumsy to mount, and/or cannot be easily removed, as some have a tall profile that cannot fit under normal overhangs of into garages.

In view of the above, it is an object of the present invention to provide an improved vehicle roof top cargo carrier that is easy to load and unload for any size and/or weight of cargo. It is further an object of the present invention to provide a vehicle roof top cargo carrier that loads from the rear of the vehicle. It is yet further an object of the present invention to provide a vehicle roof top cargo carrier wherein a portion of the carrier may be removed to reduce the height of the carrier while leaving a frame of the carrier attached to the existing roof rack members of the vehicle. Other objects are contemplated and expected.

SUMMARY OF THE INVENTION

A vehicle roof top cargo carrier, for use with all types of cargo, attaches to existing roof rack members of the vehicle, provides pivoting pic loading and unloading of cargo to and from the carrier via the rear of the vehicle, and whose height is reducible by removal of a portion of the carrier.

The vehicle roof top cargo carrier has a frame that is attached to existing rack members on the roof of a vehicle, a carriage movably carried on the frame and configured to pivot with respect to the frame once the carriage is fully extended from the rear of the frame and pivot rods at the front of the carriage are received in pivot brackets at the rear of the frame, and a support retained on the rear of the carriage and configured to adjustably telescope from the rear of the carriage to contact the ground. Cargo receptacles are secured to the carriage for holding the cargo, and can be changed to accommodate various types of cargo. The carriage and support are removable from the frame.

The frame has a first elongated lateral rail and a second elongated lateral rail, the first and second elongated lateral rails connected to one another by cross members. The first elongated lateral rail defines a first elongated open pathway for the carriage, while the second elongated lateral rail defines a second elongated open pathway for the carriage. One or more attachment members are provided on the first lateral rail that allow securement to existing roof rack members of the vehicle. Likewise, one or more attachment members are provided on the second lateral rail that allow securement to the existing roof rack members of the vehicle. A first pivot bracket is situated at the rear of the first elongated lateral rail that provides a first pivot seat for the carriage. Likewise, a second pivot bracket is situated at the rear of the second elongated lateral rail that provides a second pivot seat for the carriage.

A first outwardly flared guide is preferably, but not necessarily, provided at the rear of the first pivot bracket adjacent an opening to the first elongated pathway that directs a side of the carriage into the first elongated railway. A second outwardly flared guide is preferably, but not necessarily, provided at the rear of the second pivot bracket adjacent an opening to the second elongated pathway that directs a side of the carriage into the second elongated railway. Additionally, the frame preferably, but not necessarily, includes a first stop provided at a front side of the first elongated lateral rail, and a second stop provided at a front side of the second elongated lateral rail. The first and second stops limit forward travel of the carriage by interacting with respective first and second pivot rods at the front of the carriage.

The carriage has a first elongated side member and a second elongated side member connected to each other via cross members. One or more axles are provided between and supported by the first and second elongated side members and situated proximate the front of the carriage, while one or more axles are provided between and supported by the first and second elongated side members and situated proximate the rear of the carriage. Each axle extends through and projects slightly beyond the first and second elongated side members, the projected axles each supporting a wheel on the outside of the first and second elongated side members. The wheels ride on the first and second elongated pathways of the frame such that the carriage is movably supported on the frame. First and second housings are supported on rear cross members of the carriage and are configured to slidably hold the support.

The carriage further includes a first pivot rod situated at the front of the first elongated side member and a second pivot rod situated at the front of the second elongated side member. The first pivot rod is received by the first pivot bracket, and the second pivot rod is received by the second pivot bracket when the carriage is fully extended from the frame to allow the carriage to pivot down and up from the rear of the frame for loading and unloading cargo.

The support has a first leg that is slidably retained in the first housing of the carriage, a second leg that is slidably retained in the second housing of the carriage, and a transverse bar situated at the ends of the first and second legs. The first housing and the first leg each have a plurality of holes that accept a removable pin in order to fix the first leg relative to the first housing. Likewise, the second housing and the second leg each have a plurality of holes that accept a removable pin in order to fix the second leg relative to the second housing. By sliding the first and second legs in and out of the respective first and second housings, the length of the support relative to the end of the carriage can be set. In this manner, the support can thus be in a retracted position relative to the carriage and any number of extended positions relative to the carriage in order to allow the cross bar to reach the ground when the carriage has been extended and pivoted relative to the frame for loading of cargo.

Different cargo receptacles may be connected to the carriage for holding various cargo.

Further aspects of the present invention will become apparent from consideration of the drawings and the following description of a form of the invention. A person skilled in the art will realize that other forms of the invention are possible and that the details of the invention can be modified in a number of respects without departing from the inventive concept. The following drawings and description are to be regarded as illustrative in nature and not restrictive.

BRIEF DESCRIPTION OF THE DRAWINGS

The features of the invention will be better understood by reference to the accompanying drawings which illustrate the present invention, wherein.

Like reference numerals indicate the same or similar parts throughout the several figures.

A description of the features, functions and/or configuration of the components depicted in the various figures will now be presented. It should be appreciated that not all of the features of the components of the figures are necessarily described. Some of these non-discussed features, if any, as well as discussed features are inherent from the figures. Other non-discussed features may be inherent in component geometry and/or configuration.

DETAILED DESCRIPTION OF THE INVENTION

Figure 1:
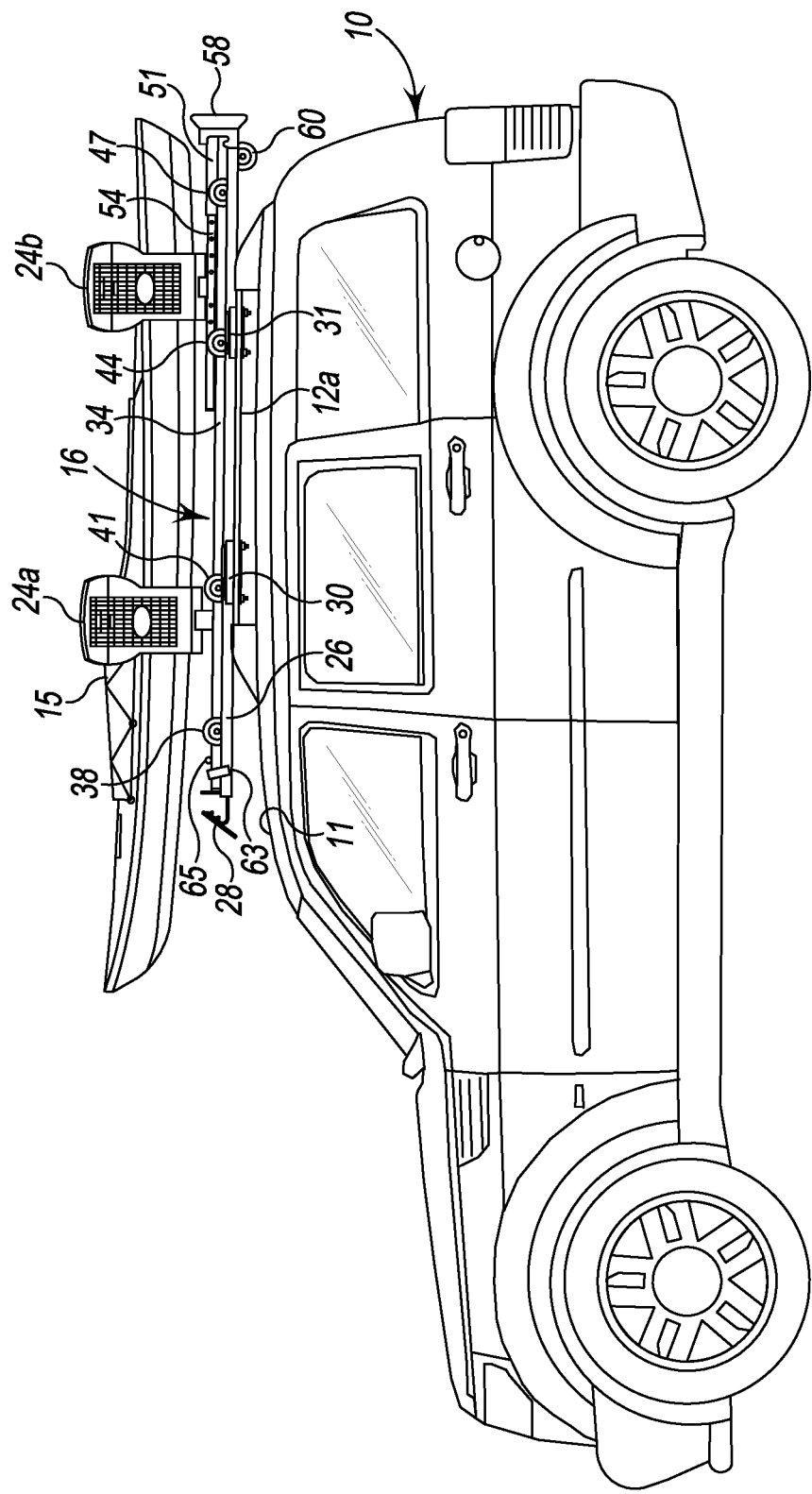
FIG. 1 is a side view of a typical vehicle having an existing roof rack with a roof top cargo carrier fashioned in accordance with the principles of the present invention, the roof top cargo carrier shown carrying a kayak in its front and rear cargo receptacles.
Figure 2:
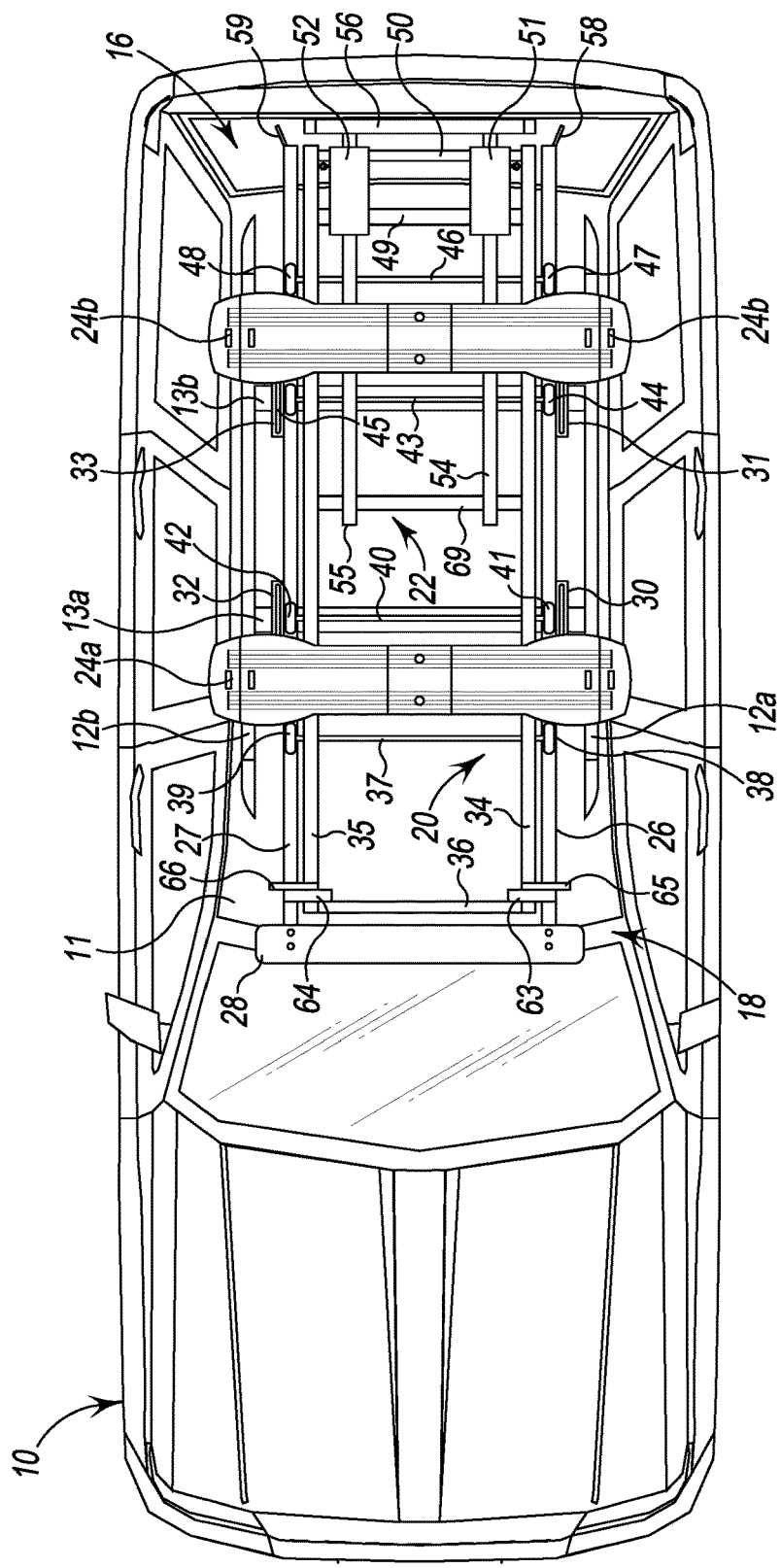
FIG. 2 is a top plan view of the vehicle having the present roof top cargo carrier in a stowed or non-extended position and without carrying cargo.

Referring to FIG. 1, there is depicted a side view of an exemplary vehicle, shown as a typical SUV 10, having typical factory installed (existing) roof rack such as a driver's side and passenger's side longitudinal roof rack members 12a, 12b situated on the roof 11 of the vehicle 10, along with typical factory installed front and rear roof rack members 13a, 13b extending between and transverse to the transverse roof rack members 12a, 12b. A vehicle roof top cargo carrier 16, fashioned in accordance with the present principles, is also shown attached to the transverse front and rear roof rack members 13a, 13b, and supporting a kayak 15 as cargo in and/or on front and rear cargo receptors 24a, 24b. FIG. 2 shows a top view of the vehicle 10 with the present vehicle roof top cargo carrier 16 without cargo. FIGS. 3-11 show various views of the present vehicle roof top cargo carrier 16 without cargo and in various extended and non-extended states or positions as described more fully below. The present vehicle roof top cargo carrier may be attached to other members of the existing vehicle roof rack and/or at places other than shown.

The vehicle roof top cargo carrier 16 is characterized by a frame or outer frame 18 that is connected to the existing transverse front and rear roof rack members 13a, 13b of the vehicle 10, a carriage or inner frame 20 that is received by the frame 18 and movable with respect thereto, and a support or end frame 22 that is retained by and movable with respect to the carriage 20. As explained below, the carriage 20 is extendable from the rear of the frame 18 and thus the rear of the vehicle 10 to provide cargo loading/unloading onto/from the carriage 20 via the rear of the vehicle 10. The carriage 20 is then moved back into the frame 18. The support 22 is extendable from the rear of the carriage 20 in order to contact the ground and thus adjustably set the angle of the carriage 20 relative to the roof rear of the vehicle for loading and unloading of cargo.

The frame 18 has a first or driver's side elongated lateral rail 26 and a second or passenger's side elongated lateral rail 27, the nomenclature first and second being arbitrary here and throughout. The first and second elongated lateral rails 26, 27 each has an "L" shape that defines respective first and second open railways, of which the second open railway 90 is particularly seen in FIG. 7, with the first open railway be identical but opposite thereto. The first open railway defined by the first elongated lateral rail 26 of the frame 18 receives wheels 38, 41, 44, 47, of the carriage 20, while the second elongated lateral rail 27 of the frame 18 receives wheels 39, 42, 45, 48, of the carriage 20 to allow the carriage 20 to be movable along and with respect to the frame 18. A header 28 is connected at and to the front of the first and second elongated lateral rails 26, 27 for frame stability. The header 28 is also configured to provide air deflection over the vehicle roof top cargo carrier 16.

Figure 3:
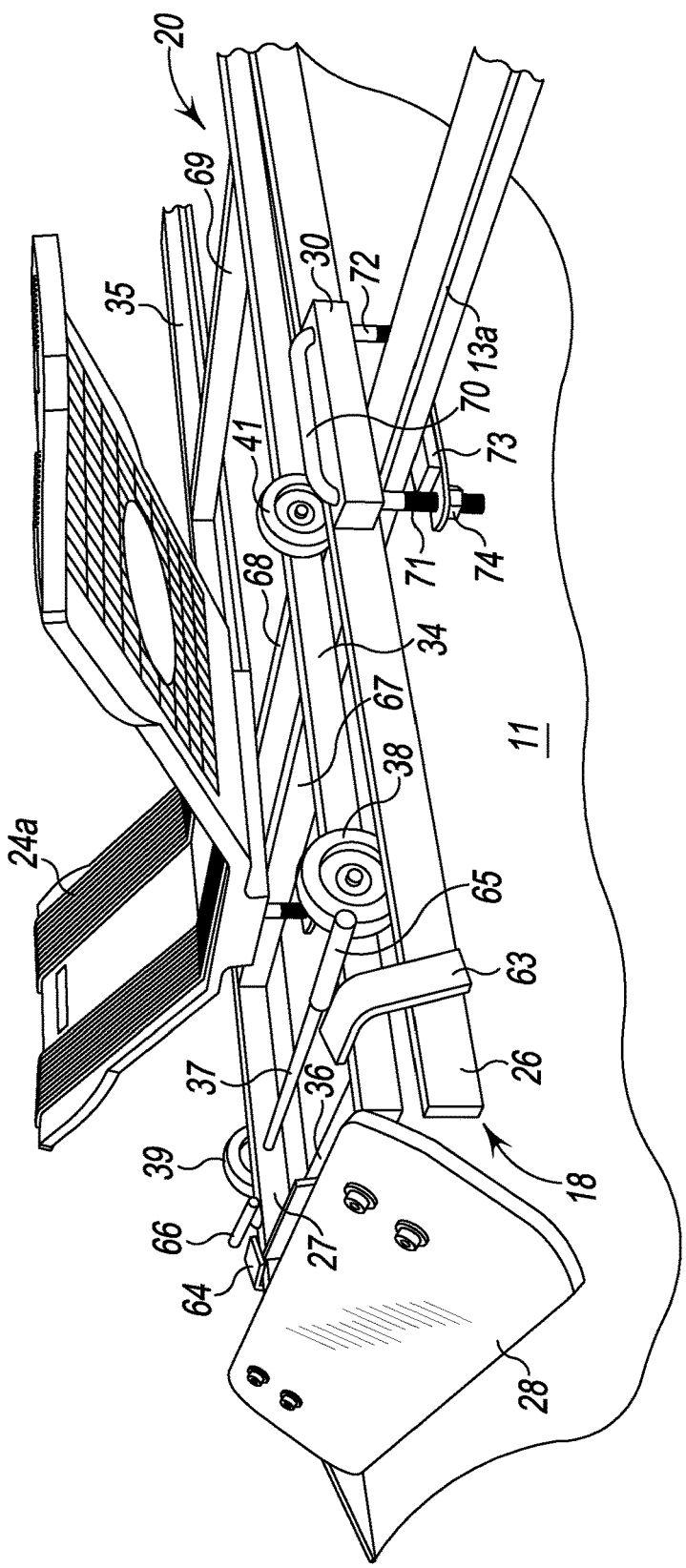
FIG. 3 is an enlarged view of a front portion of the present roof top cargo carrier attached onto the roof of the vehicle, the roof top cargo carrier in a stowed position or non-extended position without carrying cargo.
Figure 4:
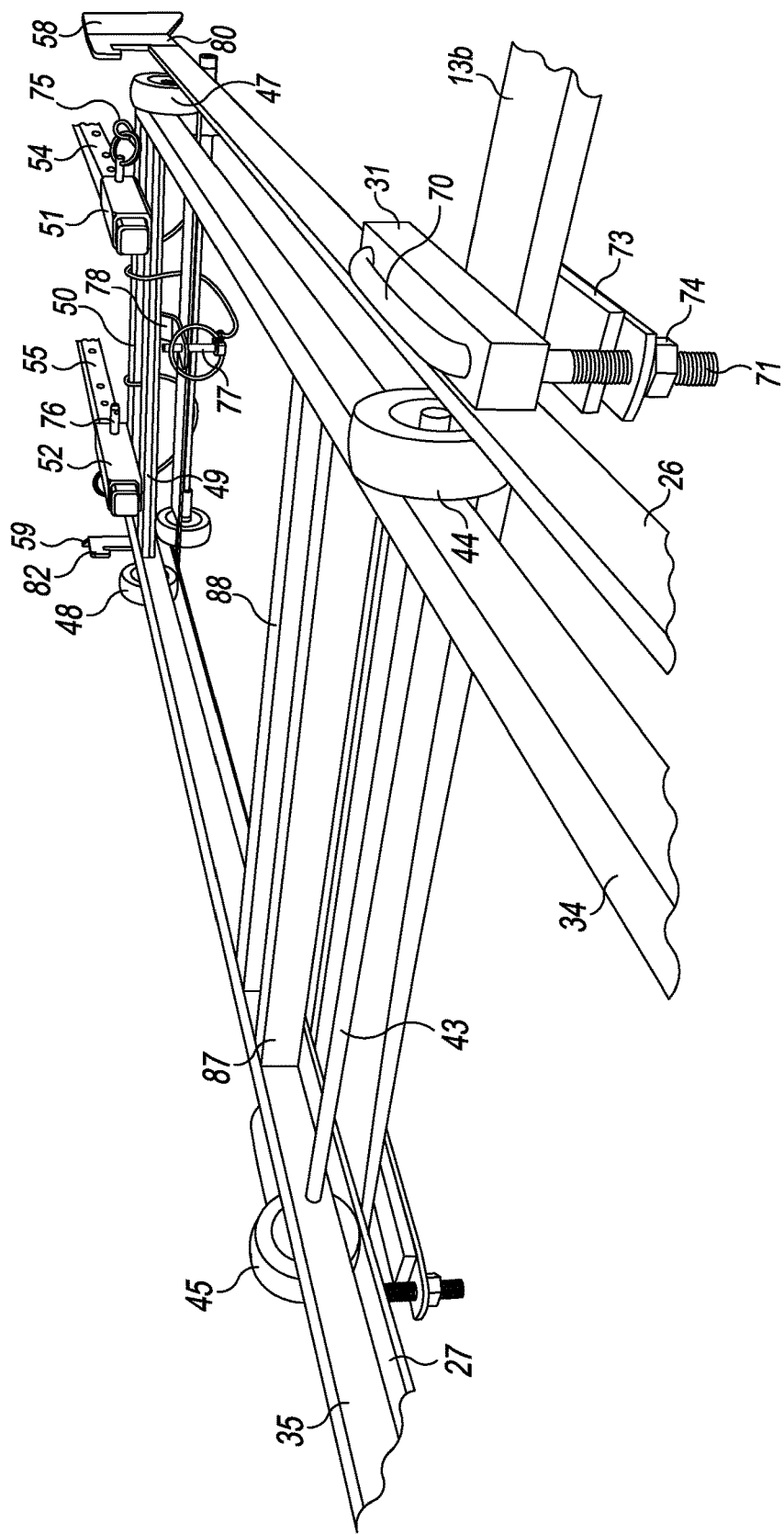
FIG. 4 is an enlarged view of a middle portion of the present roof top cargo carrier attached onto the roof of the vehicle, the roof top cargo carrier in a stowed or non-extended position without cargo and shown without a front cargo receptacle.

The first elongated lateral rail 26 has a first or front boss 30 situated on the outside thereof and a second or rear boss 31 likewise situated on the outside thereof. The first and second bosses 30, 31 allow attachment of the first elongated lateral rail 26 to the existing roof rack members of the vehicle. Particularly, and as best seen in FIG. 3, the first boss 30 is situated over the transverse front roof rack member 13a and has bores to receive first and second threaded legs 71, 72 of a U-bolt 70. A plate 73 is provided under the transverse front roof rack member 13a that receives the first and second threaded legs 71, 72 of the U-bolt 70. Nuts 74 are threaded onto the first and second threaded legs 71, 72 to clamp the plate 73 against the underside of the transverse front roof rack member 13a while the U-bolt 70 compresses down on the boss 30 for securement to the transverse front roof rack member 13a. Likewise, and as best seen in FIG. 4, the second boss 31 is situated over the transverse rear roof rack member 13b and has bores to receive first and second threaded legs 71, 72 of a U-bolt 70. A plate 73 is provided under the transverse rear roof rack member 13b that receives the first and second threaded legs 71, 72 of the U-bolt 70. Nuts 74 are threaded onto the first and second threaded legs 71, 72 to clamp the plate 73 against the underside of the transverse rear roof rack member 13b while the U-bolt 70 compresses down on the boss 31 for securement to the transverse rear roof rack member 13b.

The second elongated lateral rail 27 also has a first or front boss 32 situated on the outside thereof and a second or rear boss 33 likewise situated on the outside thereof. The first and second bosses 32, 33 allow attachment of the second elongated lateral rail 27 to the existing roof rack members of the vehicle in the same manner as described above with respect to the first elongated lateral rail 26.

Figure 6:
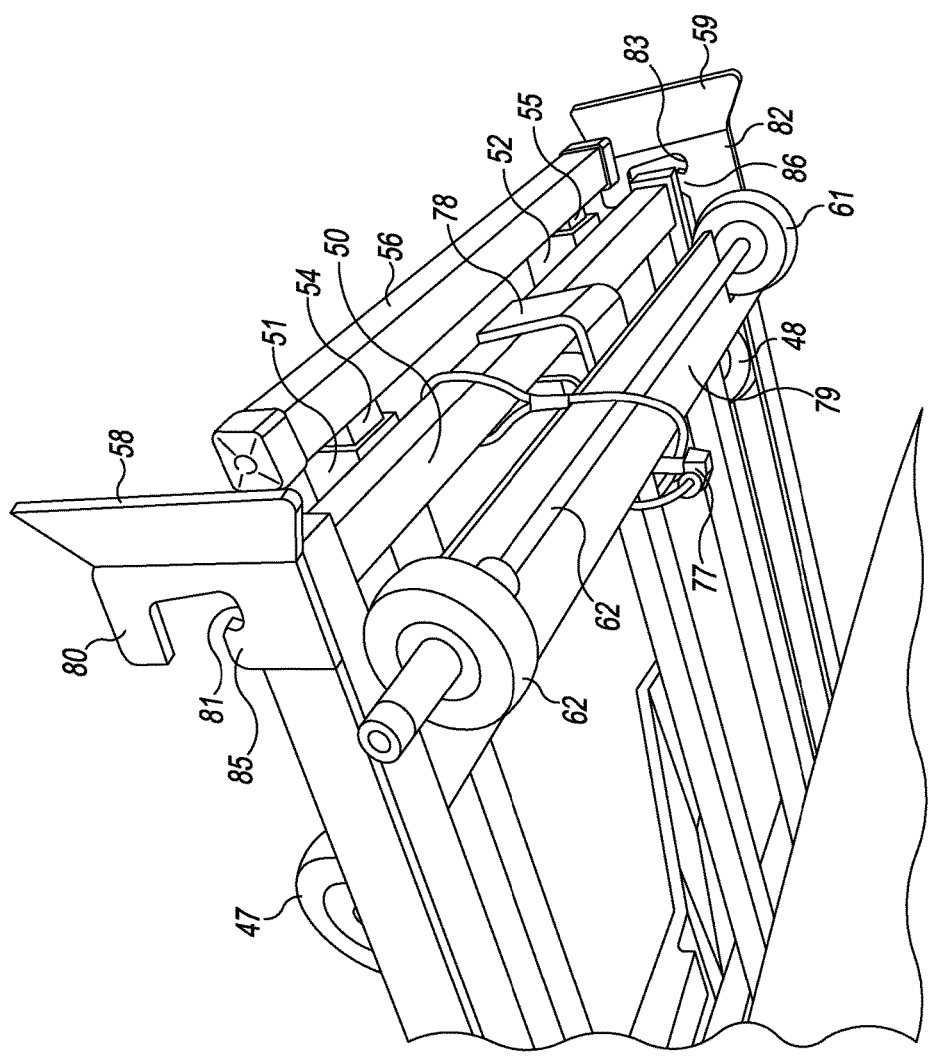
FIG. 6 is an enlarged view of an end portion of the present roof top cargo carrier attached onto the roof of the vehicle, the roof top cargo carrier without cargo and shown in a stowed or non-extended position.

The first elongated lateral rail 26 further includes a first pivot bracket 80 situated at the rear thereof, with the second elongated lateral rail 27 also further including a second pivot bracket 82 at the rear thereof. As best seen in FIG. 6, the first pivot bracket has a cutout 81 defining a first pivot seat for a first pivot rod 65 of the carriage 20. The cutout 81 is configured with a flange 85 that defines a raised catch for the first pivot rod 65 of the carriage 20, the operation of which is described more fully below. Likewise, the second pivot bracket 82 has a cutout 83 defining a second pivot seat for a second pivot rod 66 of the carriage 20. The cutout 83 is configured with a flange 86 that defines a raised catch for the second pivot rod 66 of the carriage 20, the operation of which is described more fully below.

The frame 18 moreover includes a rear cross bar 79 (see, e.g. FIGS. 6 and 8) that extends between and connects with the rear of the first elongated lateral rail 26 and the rear of the second elongated lateral rail 27. An axle 62 is retained under and extends along the rear cross bar 79. The axle 62 rotatably supports first and second wheels 61 and 62. As described more fully below, the first and second wheels 61, 62 aid in extending, pivoting, and retracting the carriage 20 relative to the frame 18. A first outwardly flared guide 58 is provided at the rear end of the first pivot bracket 80, while a second outwardly flared guide 59 is provided at the rear end of the second pivot bracket 82. The first and second outwardly flared guides 58, 59 provide guidance for the right and left side wheels of the carriage 20 into the first and second railways of the frame 18 (see e.g. FIG. 7 which shows the second railway 90).

Additionally, and as best seen in FIGS. 2 and 3, a first stop 63 is provided at the front of the first elongated lateral side rail 26, while a second stop 64 is provided at the front of the second elongated lateral side rail 27. The first stop 63 extends up and laterally inwardly from the first elongated lateral side rail 26. The second stop 64 extends up and laterally inwardly from the second elongated lateral side rail 27. As described more fully below, the first and second stops 63, 64 cooperate with the first and second pivot rods 65, 66 of the carriage 20 to stop forward travel of the carriage 20 within the frame 18.

Figure 9:
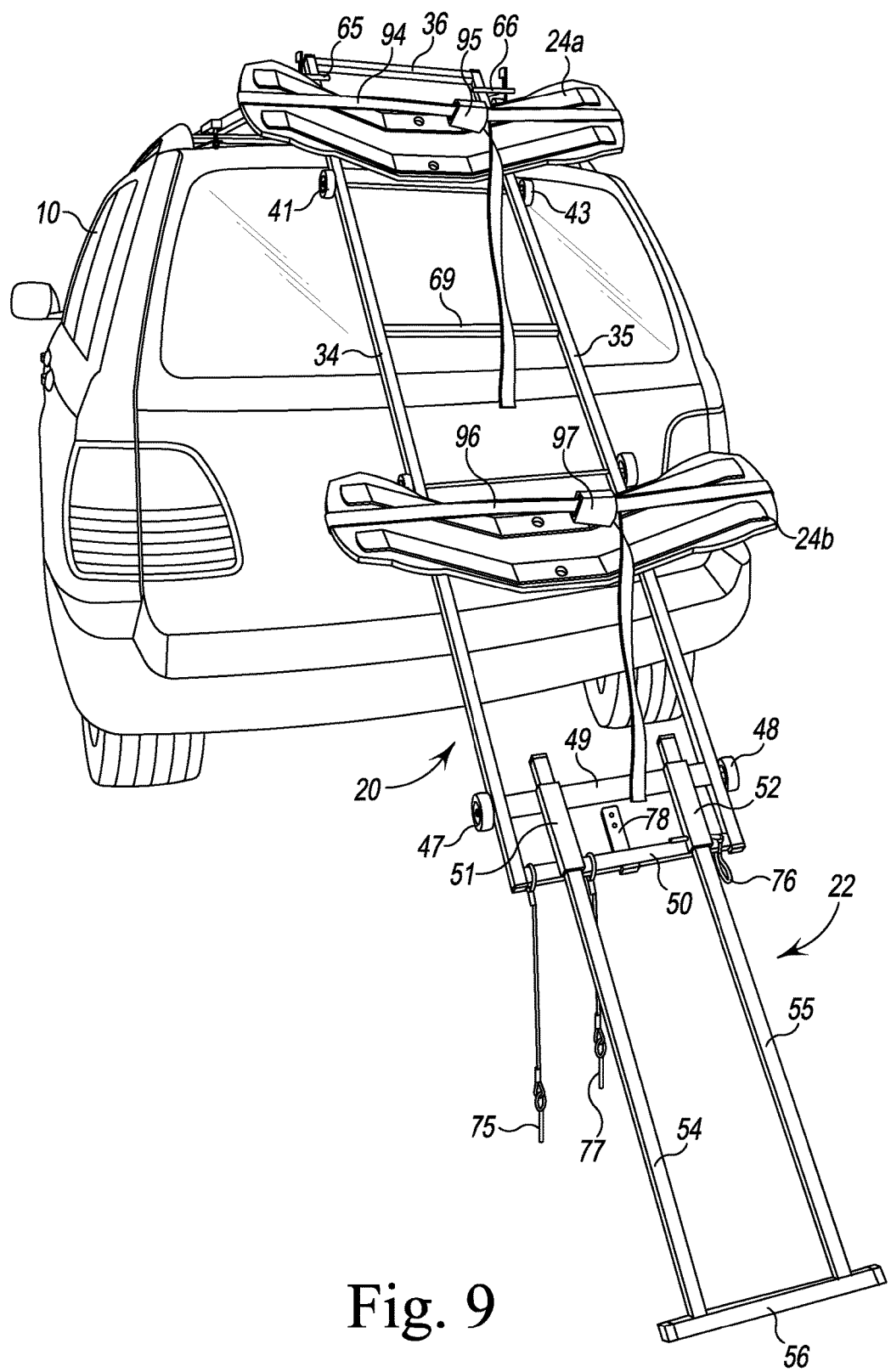
FIG. 9 is a view of the rear of the vehicle with the present roof top cargo carrier attached onto the roof of the vehicle with the carriage and support thereof in a fully extended position ready for cargo loading.
Figure 10:
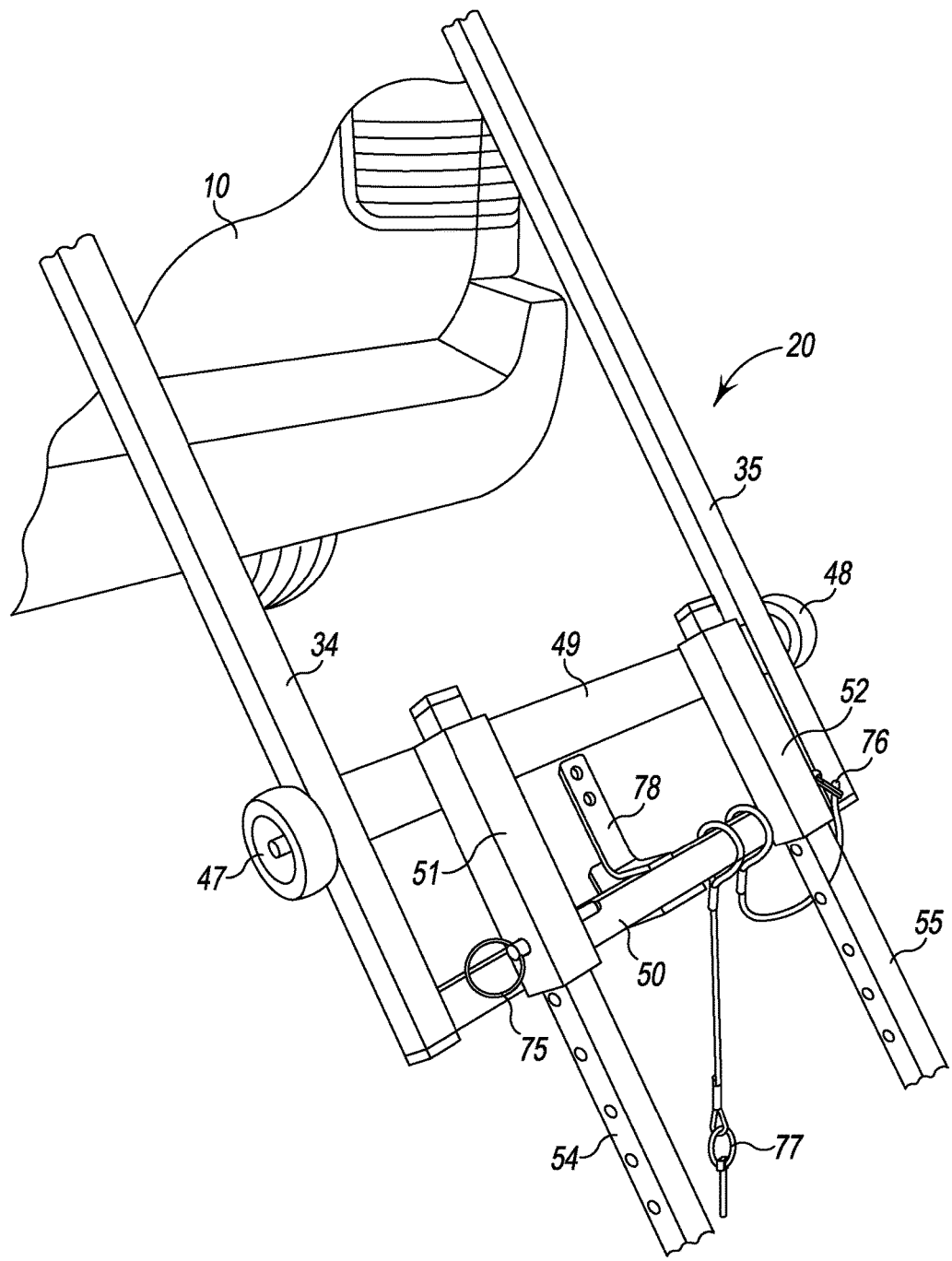
FIG. 10 is an enlarged view of a portion of the fully extended position of the present roof top cargo carrier as shown in FIG. 9.

The carriage 22 has a first elongated side member 34 and a second elongated side member 35 connected to each other by a front cross member 36, first and second middle front cross members 67, 68 (see, e.g. FIG. 3), a middle cross member 69, a first and second middle rear cross members 87, 88 (see, e.g. FIG. 4) and first and second rear cross members 49, 50 (see, e.g. FIGS. 9 and 10). A first axle 37 is provided through and between the first and second elongated side members 34, 36 between the front cross member 36 and the first middle front cross member 67. The first axle 37 rotatably supports a wheel 38 laterally outside of the first elongated side member 34 and a wheel 39 laterally outside of the second elongated side member 36. A second axle 40 is provided through and between the first and second elongated side members 34, 36 between the second middle front cross member 68 and the middle cross member 69. The second axle 40 rotatably supports a wheel 41 laterally outside of the first elongated side member 34 and a wheel 42 laterally outside of the second elongated side member 36. A third axle 43 is provided through and between the first and second elongated side members 34, 36 between the middle cross member 69 and the first middle rear cross member 87. The third axle 43 rotatably supports a wheel 44 laterally outside of the first elongated side member 34 and a wheel 45 laterally outside of the second elongated side member 36. A fourth axle 46 is provided through and between the first and second elongated side members 34, 36 between the second middle rear cross member 88 and the first rear cross member 49. The fourth axle 46 rotatably supports a wheel 47 laterally outside of the first elongated side member 34 and a wheel 48 laterally outside of the second elongated side member 36.

The wheels 38, 41, 44 and 47 ride on the railway of the first elongated lateral rail 26 while the wheels 39, 42, 45 and 48 ride on the railway of the second elongated lateral rail 27 such that the carriage 20 is freely movable along and with respect to the frame 18. The carriage 20 is also not connected to the frame 18 so that the carriage 20 can be removed from the frame 18.

The first pivot rod 65 extends laterally outward from a front portion of the first elongated side member 34 while the second pivot rod 66 extends laterally outward from a front portion of the second elongated side member 35. In addition to cooperating with the first and second pivot brackets 80, 82 of the frame to form a pivot for the carriage 20 with respect to the frame 18, the first and second pivot rods 65, 66 abut the first and second stops 63, 64 of the first and second elongated lateral rails 26, 27 when the front of the carriage 20 is at the front of the frame 18, thus stopping further forward travel of the carriage 20 with respect to the frame 18.

The carriage 20 further has a first housing 51 situated on a lateral side of the first and second rear cross members 49, 50 and a second housing 52 situated the other lateral side of the first and second rear cross members 49, 50. The first housing 51 has a channel extending from the front of the housing 51 to the rear of the housing 51, and a bore extending through both sides of the housing 51 transverse to the channel, the bore sized to receive a first housing pin 75, the purpose of which is explained below. The second housing 52 likewise has a channel extending from the front of the housing 52 to the rear of the housing 52, and a bore extending through both sides of the housing 52 transverse to the channel, the bore sized to receive a second housing pin 76, the purpose of which is explained below.

Figure 5:
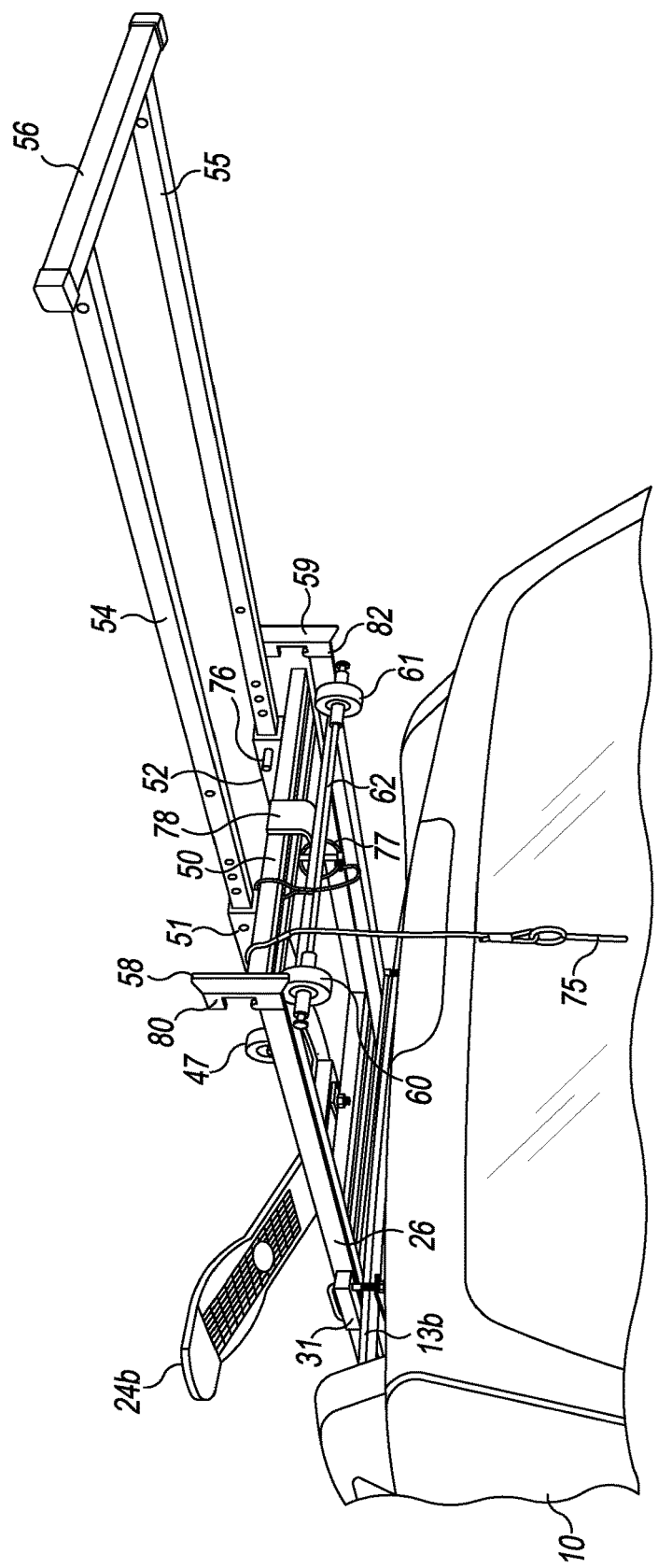
FIG. 5 is a view of a rear portion of the present roof top cargo carrier attached onto the vehicle, the roof top cargo carrier without cargo and shown in a partially extended position.
Figure 7:
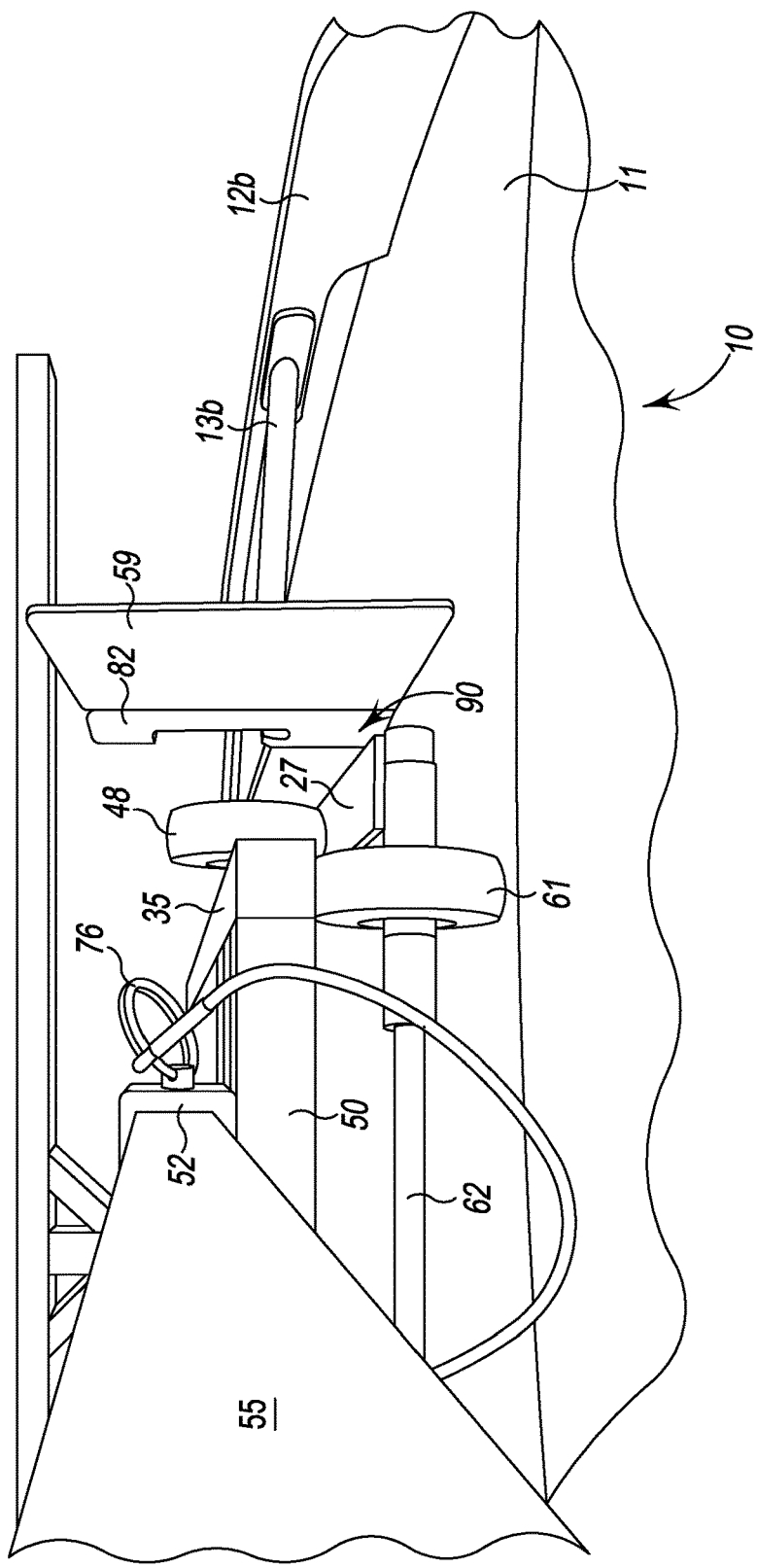
FIG. 7 is an enlarged view from the rear of the vehicle of one side of the end of the present roof top cargo carrier attached onto the roof of the vehicle, the roof top cargo carrier with the support thereof in a partially extended position.
Figure 8:
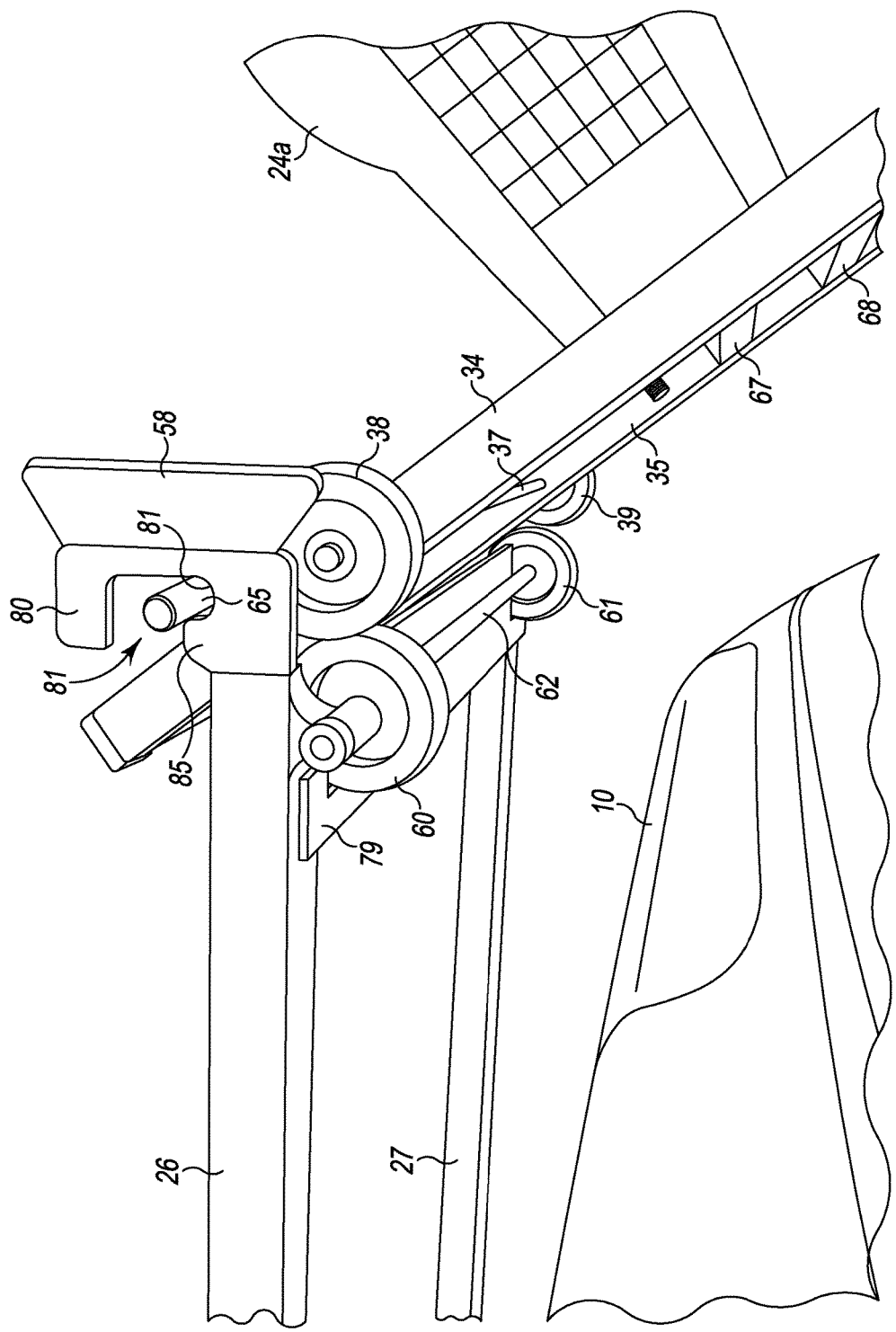
FIG. 8 is an enlarged view of the end of the vehicle with the present roof top cargo carrier attached onto the roof of the vehicle, the movable carriage thereof in an extended and pivoted position.

The support 22 has a first leg 54 with a plurality of through holes, and a second leg 55 also with a plurality of through holes. A transverse member 56 is provided at and between the ends of the first and second legs 54, 55. The first leg 54 is slidably received in the first housing 51 of the carriage 20, while the second leg 55 is slidably received in the second housing 52 of the carriage 20 such that the support 22 may be extended and retracted relative to the carriage 20. The first housing pin 75 is used to fix the first leg 54 in and relative to the first housing 51, while the second housing pin 76 is used to fix the second leg 55 in and relative to the second housing 52. The length of extension of the support 22 relative to the carriage 20 is controlled by sliding the first and second legs 54, 55 relative to the first and second housings 51, 52. In FIGS. 2 and 6 for example, the support 22 and thus the first and second legs 54, 55 are fully retracted relative to the carriage 20. In FIGS. 4, 5, 9 and 10, the support 22 and thus the first and second legs 54, 55 are full extended relative to the carriage. FIG. 4 depicts the first housing pin 75 extending through the bore of the first housing 51 and one set of through holes of the first leg 54 to fix the first leg 54 relative to the first housing 51. Likewise, the second housing pin 76 extends through the bore of the second housing and one set of through holes of the second leg 55 to fix the second leg 55 relative to the second housing 52. FIG. 5 depicts the support 22 fully extended from the carriage 20 and ready for fixing (locking) or releasing (unlocking) the support 22 relative to the carriage 20, with the first housing pin 75 removed from the first housing 51 and the second housing pin 76 in the housing 52. Both of the housing pins 75, 76 are preferably, but not necessarily, tethered or otherwise connected to the carriage 20. FIG. 7 shows the second housing pin 76 received in the second housing 52 and tethered or otherwise connected to the carriage 20. FIG. 9 shows the support 22 fully extended from the carriage 20 with the tethered first housing pin 75 removed from the first housing 51 and the tethered second housing pin 76 in the second housing 52. FIG. 10 shows both tethered housing pins 75, 76 in their respective first and second housing and thus fixing the first and second legs 54, 55 from sliding relative to the first and second housings.

As best seen in FIGS. 4-6 and 9-10, the carriage 20 includes an angle bracket 78 on the second rear end cross member 50. The angle bracket 78 has a plurality of holes (see FIGS. 9-10) that are sized to receive a carriage pin 77 that is preferably, but not necessarily, tethered or otherwise connected to the carriage 20. The carriage pin 77 fixes the angle bracket 78 to the rear of the frame 18. FIGS. 5 and 6 show the carriage pin 77 received by the frame 18 and angle bracket 78 to fix the carriage 20 to the frame 18. FIGS. 9 and 10 show the carriage pin 77 disengaged from the frame 18 and the angle bracket 78 because the carriage 20 is extended from the frame 18.

Figure 11:
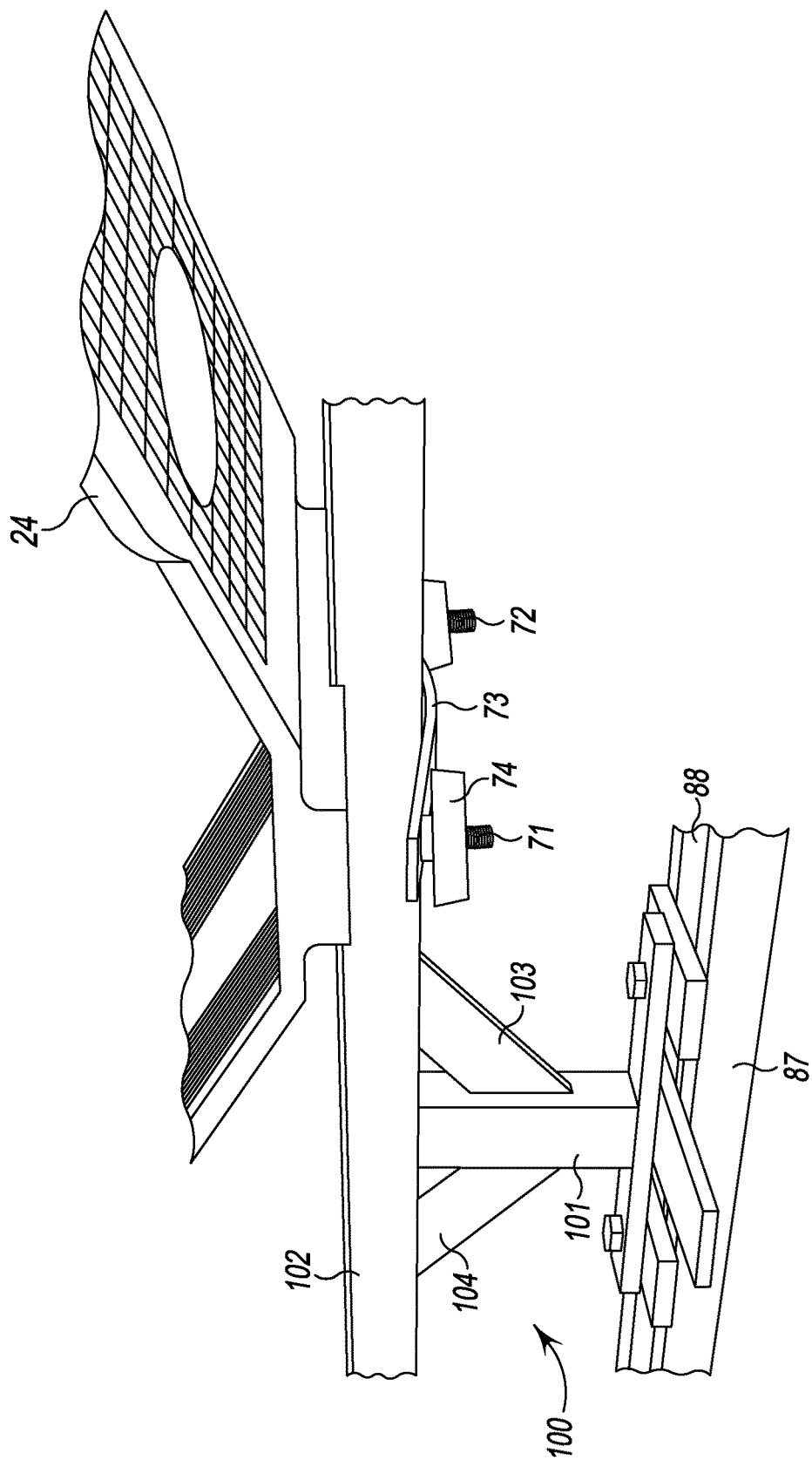
FIG. 11 is an enlarged view of a cargo receptacle for the present roof top cargo carrier.

As seen in various figures, the carriage 20 has first and second cargo receptacles 24a, 24b, the first cargo receptacle 24a connected onto the first and second front middle cross members 67, 68 of the carriage 20, and the second cargo receptacle connected onto the first and second rear middle cross members 87, 88 of the carriage. Note that FIG. 4 does not depict the second cargo receptacle 24b as is shown in other figures. It should be appreciated that the carriage 20 may have a single cargo receptacle or more than two cargo receptacles. Also, other styles and/or sizes of cargo receptacles may be used as desired or necessary for various types of cargo. The cargo receptacles 24a, 24b can hold a kayak 15 (as shown in FIG. 1) as well as other cargo. Referring to FIG. 11, a variation of a cargo holder that can be used with the present vehicle roof top cargo carrier 16 is shown. The cargo holder 100 includes a horizontal bar 102 supported by a stand 101 that is connected to cross members (cross members 87, 88 shown) of the carriage 20. Preferably, but not necessarily, the stand 101 is supported by first and second braces 103, 104. A cargo receptacle 24 may be attached to the bar 102. Alternately, just the bar 102 itself may be used as the cargo receptacle or holder, the cargo strapped to the bar 102 or otherwise secured thereto. Other cargo receptacles/holders are contemplated.

The present vehicle roof top cargo carrier 16 is shown in a stowed or fully retracted position in FIGS. 1 and 2 wherein the carriage 20 is fully forward with respect to the frame 18 and the support 22 is fully forward with respect to the carriage 20. In this position, the vehicle roof top cargo carrier 16 can securely carry or not carry cargo as desired. The carriage pin 77 is received in the angle bracket 78 through the rear of the frame 18 to fix movement of the carriage 20 relative to the frame 18. The first and second legs 54, 55 of the support 22 are fully forward with respect to the first and second housings 51, 52 with the first and second housing pins 75, 76 received in and through the respective first and second housings and respective first and second legs 54, 55.

For loading cargo onto or removing cargo from the vehicle roof top cargo carrier 16, the support 22 is extended from the carriage 20 by removing the first and second housing pins 75, 76 from the first and second housings 51, 52 (see e.g. FIG. 5). Once the support 22 has been extended a desired length, the first and second housing pins 75, 76 are placed back into the respective first and second housings 51, 52 and the holes of the first and second legs 54, 55 (see e.g. FIG. 10) to fix the support relative to the carriage 22. The carriage pin 77 is removed and the carriage 20 is pulled out or extended from the rear of the frame 18 and thus the rear of the vehicle 10. Once the front of the carriage 22 reaches the end of the frame 18 and thus the first and second pivot brackets, the first and second pivot rods 65, 66 fall into the respective cutouts 81, 83 of the respective pivot brackets 80, 82. At this point, the carriage 22 is free to pivot downwardly with respect to the rear of the frame 18 and thus the rear of the vehicle 10 (see e.g. FIGS. 8, 9). The first and second flanges 85, 86 of the respective first and second pivot brackets 80, 82 prevent the respective first and second pivot rods 65, 66 from coming out of the respective first and second pivot cutouts 81, 83. The wheels 61, 62 of the rear of the frame 18 aid in extending the carriage 20 from the frame 18. FIG. 9 shows the carriage 20 and the support 22 in a fully extended and pivoted position ready for cargo loading (and unloading if cargo was on the carriage 20). First housing pin 75 is shown removed from the first housing 51 to illustrate its tethering. Also shown is a strap 94 and associated strap latch 95 for holding cargo onto the cargo receptacle 24a. Likewise shown is a strap 96 and associated strap latch 97 for holding cargo onto the cargo receptacle 24b.

When retracting the carriage 20 and the support 22, the carriage 20 and the support 22 are raised or pivoted upwardly wherein the front wheels 38, 39 begin to be received in the respective first and second railways of the first and second elongated laterals rails 26, 27. This action lifts the first and second pivot rods 65, 66 from the respective cutouts 81, 83 of the respective first and second pivot brackets 80, 82 and over the respective first and second flanges 85, 86 thereof. The carriage 20 and the support 22 are now free to move forward along the first and second railways until the first and second pivot rods 65, 66 reach the respective first and second stops 63, 64 of the frame 18. The support 22 is then retracted relative to the carriage 20 and the appropriate pins are secured in place.

It should be appreciated that variations of the above-described procedure for loading cargo to and unloading cargo from the vehicle roof top cargo carrier 16 are contemplated.

The present vehicle roof top cargo carrier 16 allows the carriage 20 and thus the support 22 to be easily removed from the frame 16. This provides a remedy where height of the carriage and its cargo receptacles is a concern.

It should be appreciated that dimensions of the components, structures, and/or features of the present automobile roof top cargo carrier may be altered as desired within the scope of the present disclosure.

What is claimed is:

1. A vehicle roof top cargo carrier for attachment to existing roof rack members of a vehicle, the vehicle roof top cargo carrier comprising:
  a frame having a first elongated lateral rail defining a first front end, a first rear end, a first open railway extending between the first front end and the first rear end, a second elongated lateral rail defining a second front end generally perpendicular to the first front end of the first elongated lateral rail, a second rear end generally perpendicular to the first rear end of the first elongated lateral rail, a second open railway extending between the second front end and the second rear end, a front cross member connected to and extending between the first elongated lateral rail and the second elongated lateral rail, a first boss associated with the first elongated lateral rail and configured for attachment to an existing roof rack member of existing roof rack members of the vehicle, a second boss associated with the second elongated lateral rail and configured for attachment to an existing roof rack member of existing roof rack members, a first pivot bracket at the first rear end of the first elongated lateral rail and having a first pivot cutout, a second pivot bracket at the second rear end of the second elongated lateral rail and having a second pivot cutout;
  a carriage having a first elongated side rail defining a first front and a first rear, a second elongated side rail defining a second front and a second rear, a plurality of cross rails connected to and extending between the first elongated side rail and the second elongated side rail, a plurality of axles each one extending from laterally outside of the first elongated side rail to laterally outside of the second elongated side rail, a first wheel and a second wheel rotatably supported on each one of the plurality of axles, the first wheel of which is supported on the axle laterally outside of the first elongated side rail and the second wheel of which is supported on the axle laterally outside of the second elongated side rail, the first wheels received in the first railway and the second wheels received in the second railway to allow the carriage to move with respect to the frame, a first housing having a first channel extending through the first housing and a first bore extending through the first housing transverse to the first channel, a second housing having a second channel extending through the second housing and a second bore extending through the second housing transverse to the second channel, a first pivot rod extending transversely from the first front of the first elongated side rail, and a second pivot rod extending transversely from the second front of the second elongated side rail;
  a support having a first leg slidably received in the first channel of the first housing of the carriage with a plurality of first leg through holes and defining a first leg front and a first leg rear, a second leg slidably received in the second channel of the second housing of the carriage with a plurality of second leg through holes and defining a second leg front and a second leg rear, and a cross bar connected to and extending between the first leg rear of the first leg and the second leg rear of the second leg, the support movable with respect to the carriage by sliding movement of the first and second legs in the respect first and second housings;
  a first housing pin receivable in the first bore of the first housing and one of the plurality of through holes of the first leg to fix the first leg relative to the first housing;
  a second housing pin receivable in the second bore of the second housing and one of the plurality of through holes of the second leg to fix the second leg relative to the second housing; and
  cargo receptacles supported on the carriage and configured to receive and hold cargo;
  the carriage pivotable with respect to the rear of the frame as the carriage moves along the first and second railways and first and second pivot rods at the first and second fronts of the first and second elongated side rails reach the respective first and second pivot brackets and are received in the respective first and second cutouts.

2. The vehicle roof top cargo carrier of claim 1, wherein:
  the first pivot bracket includes a first flange that inhibits the first pivot rod from disengaging from the first cutout of the first pivot bracket during pivoting of the carriage; and
  the second pivot bracket includes a second flange that inhibits the second pivot rod from disengaging from the second cutout of the second pivot bracket during pivoting of the carriage.

3. The vehicle roof top cargo carrier of claim 2, further comprising:
  a first guide connected to an end of the first pivot bracket and angled laterally outwardly with respect to the first elongated lateral rail to direct the first wheels of the carriage into the first railway of the frame when the carriage is retracted into the frame; and
  a second guide connected to an end of the second pivot bracket and angled laterally outwardly with respect to the second elongated lateral rail to direct the second wheels of the carriage into the second railway of the frame when the carriage is retracted into the frame.

4. The vehicle roof top cargo carrier of claim 1, wherein the frame further comprises:
  a frame axle disposed at and between the first rear end of the first elongated lateral rail and the second rear end of the second elongated lateral rail;
  a first frame wheel disposed on the frame axle laterally inwardly adjacent the first elongated lateral rail; and
  a second frame wheel disposed on the frame axle laterally inwardly adjacent the second elongated lateral rail;
  the frame axle and first and second frame wheels aiding pivoting of the carriage.

5. The vehicle roof top cargo carrier of claim 1, further comprising:
- a first stop at the first front end of the first elongated lateral rail; and
- a second stop at the second front end of the second elongated lateral rail;
- the first and second stops preventing forward movement of the carriage when the respective first and second pivot rods abut the respective first and second stops.

6. The vehicle roof top cargo carrier of claim 1, wherein the front cross member of the frame is configured to direct air upwardly.

7. The vehicle roof top cargo carrier of claim 1, further comprising:
- a third boss associated with the first elongated lateral rail and configured for attachment to another existing roof rack member of existing roof rack members of the vehicle; and
- a fourth boss associated with the second elongated lateral rail and configured for attachment to another existing roof rack member of existing roof rack members of the vehicle.

8. The vehicle roof top cargo carrier of claim 1, wherein the plurality of axles and their first and second wheels of the carriage comprise a front axle, a front middle axle, a rear middle axle, and a rear axle.

9. The vehicle roof top cargo carrier of claim 8, wherein the first and second wheels of the front axle of the carriage are configured to lift the first pivot rod from the first cutout and over the first flange of the first pivot bracket and the second pivot rod from the second cutout and over the second flange of the second pivot bracket when the carriage is pivoted upwardly during retraction movement of the carriage relative to the frame as the front axle and its first and second wheels are respectively received in the first and second railways of the respective first and second elongated lateral rails of the frame.

10. The vehicle roof top cargo carrier of claim 8, wherein the cargo receptacles comprise a first cargo receptacle situated between the front axle and the front middle axle, and a second cargo receptacle situated between the rear middle axle and the rear axle.

11. The vehicle roof top cargo carrier of claim 10, wherein the first cargo receptacle is saddle shaped and the second cargo receptacle is saddle shaped.

12. The vehicle roof top cargo carrier of claim 10, wherein the first cargo receptacle comprises a first horizontal bar and the second cargo receptacle comprises a second horizontal bar.

13. The vehicle roof top cargo carrier of claim 1, further comprising a carriage bracket provided on a cross member of the carriage and configured to receive a carriage pin that when installed in the carriage bracket prevents movement of the carriage relative to the frame.

14. A vehicle roof top cargo carrier for attachment to existing roof rack members of a vehicle, the vehicle roof top cargo carrier comprising:
- a frame having a first elongated lateral rail defining a first front end, a first rear end, a first open railway extending between the first front end and the first rear end, a second elongated lateral rail defining a second front end generally transverse to the first front end of the first elongated lateral rail, a second rear end generally transverse to the first rear end of the first elongated lateral rail, a second open railway extending between the second front end and the second rear end, a front cross member connected to and extending between the first elongated lateral rail and the second elongated lateral rail, a first attachment member associated with the first elongated lateral rail and configured for securement to an existing roof rack member of existing roof rack members of the vehicle, a second attachment member associated with the second elongated lateral rail and configured for securement to an existing roof rack member of existing roof rack members, a first pivot bracket at the first rear end of the first elongated lateral rail, a second pivot bracket at the second rear end of the second elongated lateral rail;
- a carriage having a first elongated side rail defining a first front and a first rear, a second elongated side rail defining a second front and a second rear, a plurality of cross rails connected to and extending between the first elongated side rail and the second elongated side rail, a plurality of axles each one extending from laterally outside of the first elongated side rail to laterally outside of the second elongated side rail, a first wheel and a second wheel rotatably supported on each one of the plurality of axles, the first wheel of which is supported on the axle laterally outside of the first elongated side rail and the second wheel of which is supported on the axle laterally outside of the second elongated side rail, the first wheels received in the first railway and the second wheels received in the second railway to allow the carriage to move with respect to the frame, a first housing having a first channel extending through the first housing and a first bore extending through the first housing transverse to the first channel, a second housing having a second channel extending through the second housing and a second bore extending through the second housing transverse to the second channel, a first pivot rod extending transversely from the first front of the first elongated side rail, and a second pivot rod extending transversely from the second front of the second elongated side rail;
- a support having a first leg slidably received in the first channel of the first housing of the carriage with a plurality of first leg through holes and defining a first leg front and a first leg rear, a second leg slidably received in the second channel of the second housing of the carriage with a plurality of second leg through holes and defining a second leg front and a second leg rear, and a cross bar connected to and extending between the first leg rear of the first leg and the second leg rear of the second leg, the support movable with respect to the carriage by sliding movement of the first and second legs in the respect first and second housings; and
- cargo receptacles supported on the carriage and configured to receive and hold cargo;
- the carriage pivotable with respect to the rear of the frame as the carriage moves along the first and second railways and first and second pivot rods at the first and second fronts of the first and second elongated side rails reach the respective first and second pivot brackets.

15. The vehicle roof top cargo carrier of claim 14, wherein:
- the first pivot bracket includes a first flange that inhibits the first pivot rod from disengaging from the first pivot bracket during pivoting of the carriage; and
- the second pivot bracket includes a second flange that inhibits the second pivot rod from disengaging from the second pivot bracket during pivoting of the carriage.

16. The vehicle roof top cargo carrier of claim 15, further comprising:

a first guide connected to an end of the first pivot bracket and angled laterally outwardly with respect to the first elongated lateral rail to direct the first wheels of the carriage into the first railway of the frame when the carriage is retracted into the frame; and a second guide connected to an end of the second pivot bracket and angled laterally outwardly with respect to the second elongated lateral rail to direct the second wheels of the carriage into the second railway of the frame when the carriage is retracted into the frame.

* * * * *